US010725686B2

(12) United States Patent
Habbinga et al.

(10) Patent No.: US 10,725,686 B2
(45) Date of Patent: Jul. 28, 2020

(54) WRITE STREAM SEPARATION INTO MULTIPLE PARTITIONS

(71) Applicant: Burlywood, Inc., Longmont, CO (US)

(72) Inventors: Erik Habbinga, Fort Collins, CO (US); Kevin Darveau Landin, Longmont, CO (US); Tod Roland Earhart, Longmont, CO (US); Nathan Koch, Longmont, CO (US); John Foister Murphy, Berthoud, CO (US); David Christopher Pruett, Longmont, CO (US); John William Slattery, Boulder, CO (US); Amy Lee Wohlschlegel, Lafayette, CO (US)

(73) Assignee: Burlywood, Inc., Longmont, CO (US)

( * ) Notice: Subject to any disclaimer, the term of this patent is extended or adjusted under 35 U.S.C. 154(b) by 0 days.

(21) Appl. No.: 16/583,534

(22) Filed: Sep. 26, 2019

(65) Prior Publication Data

US 2020/0104048 A1    Apr. 2, 2020

Related U.S. Application Data

(60) Provisional application No. 62/738,780, filed on Sep. 28, 2018.

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/068* (2013.01); *G06F 3/0659* (2013.01); *G06F 12/0253* (2013.01); *G06F 2212/7205* (2013.01)

(58) Field of Classification Search
CPC ...... G06F 3/064; G06F 3/0604; G06F 3/0659; G06F 3/068; G06F 12/0253; G06F 2212/7205

See application file for complete search history.

(56) References Cited

U.S. PATENT DOCUMENTS

| 5,551,027 A | 8/1996 | Choy et al. |
| 2008/0080718 A1 | 4/2008 | Meijer et al. |
| 2012/0297121 A1 | 11/2012 | Gorobets et al. |
| 2016/0274800 A1 | 9/2016 | Earhart |
| 2018/0173427 A1 | 6/2018 | Moon et al. |

OTHER PUBLICATIONS

International Application No. PCT/US2019/053085, International Search Report & Written Opinion, 7 pages, dated Dec. 6, 2019.
Rutherford, Nicholas Trevor, Master of Science Thesis for "Elastic Cloud Storage Control for Non-Uniform Workloads," 62 pages, Jul. 2012.

*Primary Examiner* — Christopher D Birkhimer (57) ABSTRACT

A method of operating a storage controller is provided. The method includes receiving data transferred by a host for storage in a target partition of a storage media, and detecting properties of the data. The method also includes establishing one or more inferred partitions on the storage media based at least on the properties of the data, and based at least on the properties of the data, sorting subsets of the data for storage within the target partition and the one or more inferred partitions.

20 Claims, 5 Drawing Sheets

WRITE STREAM SEPARATION INTO MULTIPLE PARTITIONS

RELATED APPLICATIONS

This application hereby claims the benefit of and priority to U.S. Provisional Patent Application No. 62/738,780, titled "WRITE STREAM SEPARATION INTO MULTIPLE PARTITIONS", filed on Sep. 28, 2018 and which is hereby incorporated by reference in its entirety.

TECHNICAL FIELD

Aspects of the disclosure are related to data storage and in particular to partitioning a data stream.

TECHNICAL BACKGROUND

Flash non-volatile storage devices are commonly used in computers as high-speed solid-state storage devices. These devices require flash memory controllers that typically work as random write/random read, small data block devices. Their data block size is typically 8-16 KB. Write data received by these drives for storage may consist of distinct subsets of data types. These subsets may have differing requirements for data throughput and access time, media wear, Quality of Service (QoS), and the like. Typically, flash memory controllers do not recognize or distinguish between these different subsets when storing data.

OVERVIEW

In an embodiment, a method of operating a storage controller is provided. The method includes receiving data transferred by a host for storage in a target partition of a storage media, and detecting properties of the data. The method also includes establishing one or more inferred partitions on the storage media based at least on the properties of the data, and based at least on the properties of the data, sorting subsets of the data for storage within the target partition and the one or more inferred partitions.

In another embodiment, a storage controller for a storage system is provided. The storage controller includes a host interface, configured to receive host data for storage within the storage system, a storage interface, configured to transmit storage data to the storage system, and processing circuitry coupled with the host interface and the storage interface.

The processing circuitry is configured to receive data transferred by a host for storage in a target partition of a storage media within the storage system, and to detect properties of the data. The processing circuitry is also configured to establish one or more inferred partitions on the storage media based at least on the properties of the data, and based at least on the properties of the data, to sort subsets of the data for storage within the target partition and the one or more inferred partitions.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The example embodiments described herein illustrate different methods for a solid-state storage device (such as a solid-state drive (SSD)) to separate a single stream of write data into multiple partitions internal to the device. The write data consists of distinct subsets that, if written to separate partitions with optimal properties for that subset, result in better overall drive performance (data throughput and access time, media wear, etc.) and lower drive cost. In examples where the host does not specify the data subset type directly with the data, the drive infers the data subset type using other information.

In an example embodiment, each partition has optimal properties for each data subset. These properties include: block size, block packing efficiency, performance (latency and throughput), flash translation layer (FTL) implementation and resource cost (flat map vs extent-based map having different dynamic random-access memory (DRAM) requirements), garbage collection algorithm, density (single-level cells (SLC) vs. triple-level cells (TLC) vs. quad-level cells (QLC)), quality of service (QoS), cache size (read and write) and policy (read-ahead), capacity, security and/or encryption, power loss protection, and the like.

In the example embodiments described below, several different separation methods are illustrated. These separation methods include: separation by data 'temperature' (hot or cold), separation by write command size, and separation by write command location. Other separation methods may be used within the scope of the present invention. These three are illustrated as example methods.

Situations where the host directly specifies data subset type with the data (i.e. Non-Volatile Memory Express (NVMe) Streams and/or Namespaces) are not described in detail herein, but can still be implemented by the embodiments described herein, within the scope of the present invention.

Separation by Temperature:

User data written in the recent past is considered "hot". If a block of data does not change by being rewritten, over time this data may be found by garbage collection and physically relocated. At this time the data is now considered "cold" and is moved internally to a separate partition from the "hot" data.

Separation by Write Command Size:

A user write command specifies a number of contiguous blocks of data to write. Write commands are separated into different internal partitions based on the total size of contiguous blocks per write command.

Separation by Write Command Location:

Each write command specifies a location (logical block address (LBA)) associated with the data to write. Write commands are separated into different internal partitions based on the write command LBA.

Drive workloads consist of different types of data, and treating all data the same can lead to inefficiencies affecting performance, media lifetime, and overall drive cost.

Drive performance is improved when the type of particular subsets of host data can be determined, leading to separation of the subsets into distinct partitions, each partition having optimal properties for the host data subset type.

Drive cost is decreased by using/sizing the physical resources (flash type, DRAM size, etc.) for the specific drive workload, instead of overprovisioning to handle a general/unknown/worst case workload.

When hot data and cold data streams are mixed inside the same partition, several problems can occur. Interleaving hot and cold data streams can disturb LBA sequentiality in either stream. Sequential data is packed efficiently on the media for reading, and interruptions in sequentiality can lead to a decrease in read performance. Sequential data is optimally tracked in an extent-based mapping table, and interruptions in sequentiality require more extents, leading to a decrease in read performance, longer table restore times, and additional, costly memory. Also, interleaving hot and cold data streams in the same partition can cause the cold data to be garbage collected several times unnecessarily, increasing write amplification and premature media wear.

Writing cold data to a separate partition preserves LBA sequentiality in both the hot and cold data streams and allows the cold data to be garbage collected on an appropriate cadence.

When internally writing to media such as NAND, the internal write block size is generally larger than the external block size. This means that the drive may need to accumulate data from multiple host write commands before performing an internal write. This accumulated data may be stored in volatile memory. If the drive loses power, and is unable to write this accumulated data to the media when power is lost, the user data is then also lost. To solve this problem of user data stored in volatile media, host software may issue flush operations to the drive which may force the device to pad out the data waiting to be accumulated in order to perform an internal write. This can waste internal capacity and increase write amplification.

By separating host writes by command block size into multiple partitions, the drive can match properties of an internal partition to the expected block sizes being written to it and more efficiently use the capacity. A drive can detect data subset types through several different methods.

Separation by Temperature:

Stored data can be considered 'hot' or 'cold' depending upon a frequency of updates to the data on the storage media. In an initial state, all data written from the host is considered hot and is written to the same partition. Over time, data remains hot if accessed more frequently, and this hot data is replaced with a new copy in a new media location within the partition. During garbage collection, any data remaining in its original location is classified as cold and relocated to a different partition. In an embodiment, read activity is tracked to influence the correct subset type classification. For example, data written once but read frequently is treated differently than data written once but read infrequently.

In an example embodiment, data accessed and updated frequently (i.e. hot data) is stored in fast performance/low latency media (i.e. single level cell (SLC)) or media with lower retention capability, as it will be changed or replaced in the near future. Hot data may not need to be garbage collected at all, as it changes faster than the media retention properties would require a relocation operation. Data accessed and updated infrequently (i.e. cold data) is stored in slower performance media (i.e. triple level cell (TLC) or quad level cell (QLC)) or media with higher retention capability.

Separation by Write Command Size:

For some workloads, write command size is directly correlated to data subset type:

Filesystem data and metadata is written using small write commands, and is read and written frequently.

User data (i.e. database tables) in a read-dominated workload is written using large write commands, is written infrequently but read frequently.

Other user data (i.e. logging) is written and over-written in medium-sized write commands, is written frequently but read infrequently.

Separating the host write stream into multiple partitions based on write command size effectively sorts the data by access pattern as it is written by the host.

In an example embodiment, a workload comprises a relatively small number of small block regions (i.e. filesystem metadata) and a large number of large block regions (i.e. database table files). The incoming data is segregated by host command size into separate partitions. The small block partition is much smaller than the large partition, using a block size that matches the host command size. The large block partition uses an FTL algorithm appropriate for large sequential blocks (i.e. extent based), while the small block partition uses an FTL algorithm appropriate for small random blocks (i.e. flat map).

Separation by Write Command Location:

For some workloads, write command location (logical block address) is directly correlated to data subset type. Filesystem data and metadata is written in fixed locations, and is updated frequently. User data (i.e. database tables) are written to other locations, and is updated infrequently.

In other situations, the host and drive coordinate outside of the parameters available in the drive command set (i.e. SATA) and designate various LBA ranges as separate partitions, which the drive maps directly to separate partitions with appropriate properties.

For example, a hypervisor partitions its view of the drive into separate LBA regions for each of its guest processes. If the drive knows the region boundaries, it gives each region its own internal partition with appropriate QoS and security properties.

Typical legacy drives treat all data the same with regard to storage media partitions, leading to inefficiencies in media usage, lower performance, and higher cost to cover the worst-case data pattern. Newer drive command sets (i.e. NVMe Streams and Namespaces) add data type information to the command set to help the drive steer the data to an appropriate media location. However, in example embodiments, identifying data type by temperature, command size, or command location, is used in both legacy (i.e. Serial Advanced Technology Attachment (SATA)) and newer command set scenarios to provide better performance and lower cost solutions.

An enhanced drive as described herein advantageously detects distinct data subtypes from a data stream based on various indirect properties (data temperature, command size and location) and stores each data subtype in separate partitions with properties appropriate to the data subtype, leading to higher performance and lower cost.

Figure 1:
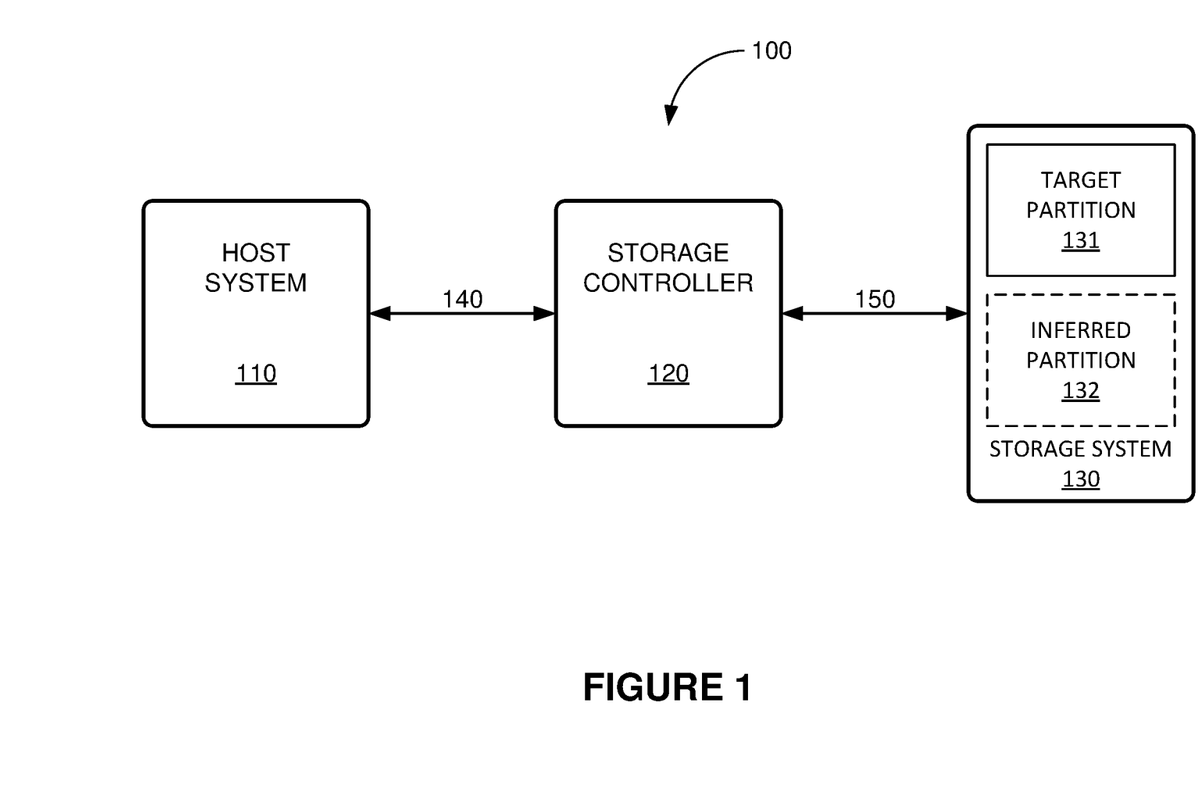
FIG. 1 illustrates a computer host and data storage system.

FIG. 1 illustrates computer host and data storage system 100. In this example embodiment, host system 110 sends data to, and receives data from, storage controller 120 for storage in storage system 130. In an example embodiment, storage system 130 comprises flash non-volatile memory, such as NAND memory. NAND memory is just one example, other embodiments of storage system 130 may comprise other types of storage. The storage media can be any non-volatile memory, such as a flash memory, magnetic random-access memory, phase change memory, optical or magnetic memory, solid-state memory, or other forms of non-volatile memory devices.

Storage controller 120 communicates with storage system over link 150, and performs the function of configuring data received from host system 110 into a format that efficiently uses the memory resources of storage system 130.

Storage controller 120 provides translation between standard storage interfaces and command protocols used by host system 110 to a command protocol and the physical interface used by storage devices within storage system 130. Additionally, storage controller 120 implements partitioning, error correction code (ECC) encode/decode functions, along with data encoding, data recovery, retry recovery methods, and other processes and methods to optimize data efficiency and integrity.

In an example embodiment, storage controller 120 is configured to separate a write data stream received from host system 110 into one or more target partitions 131 and inferred partitions 132 within storage system 130, based on properties of the write data. As discussed above, storage controller 120 may use any of several different methods to separate the write data stream into different partitions having properties optimized for each subset of the write data stream.

In an example embodiment, storage controller 120 may separate the write data stream based on data temperature, and place 'hot' data into a 'hot' inferred partition 132, and 'cold' data into a 'cold' inferred partition 132.

In other embodiments, storage controller 120 separates the write data stream based on expected block size inferred from write command size, and places large data blocks into a large block inferred partition 132, and small data blocks into a small block inferred partition 132. This example is described in further detail with respect to FIG. 3 below.

Storage controller 120 may take any of a variety of configurations. In some examples, storage controller 120 may be a Field Programmable Gate Array (FPGA) with software, software with a memory buffer, an Application Specific Integrated Circuit (ASIC) designed to be included in a single module with storage system 130, a set of Hardware Description Language (HDL) commands, such as Verilog or System Verilog, used to create an ASIC, a separate module from storage system 130, built in to storage system 130, or any of many other possible configurations.

Host system 110 communicates with storage controller 120 over various communication links, such as communication link 140. These communication links may use the Internet or other global communication networks. Each communication link may comprise one or more wireless links that can each further include Long Term Evolution (LTE), Global System For Mobile Communications (GSM), Code Division Multiple Access (CDMA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof. These communication links can carry any communication protocol suitable for wireless communications, such as Internet Protocol (IP) or Ethernet.

Additionally, communication links can include one or more wired portions which can comprise synchronous optical networking (SONET), hybrid fiber-coax (HFC), Time Division Multiplex (TDM), asynchronous transfer mode (ATM), circuit-switched, communication signaling, or some other communication signaling, including combinations, variations or improvements thereof. Communication links can each use metal, glass, optical, air, space, or some other material as the transport media. Communication links may each be a direct link, or may include intermediate networks, systems, or devices, and may include a logical network link transported over multiple physical links.

Storage controller 120 communicates with storage system 130 over link 150. Link 150 may be any interface to a storage device or array. In one example, storage system 130 comprises NAND flash memory and link 150 may use the Open NAND Flash Interface (ONFI) command protocol, or the "Toggle" command protocol to communicate between storage controller 120 and storage system 130. Other embodiments may use other types of memory and other command protocols. Other common low level storage interfaces include DRAM memory bus, SRAM memory bus, and SPI.

Link 150 can also be a higher level storage interface such as SAS, SATA, PCIe, Ethernet, Fiber Channel, Infiniband, and the like. However—in these cases, storage controller 120 would reside in storage system 130 as it has its own controller.

Figure 2:
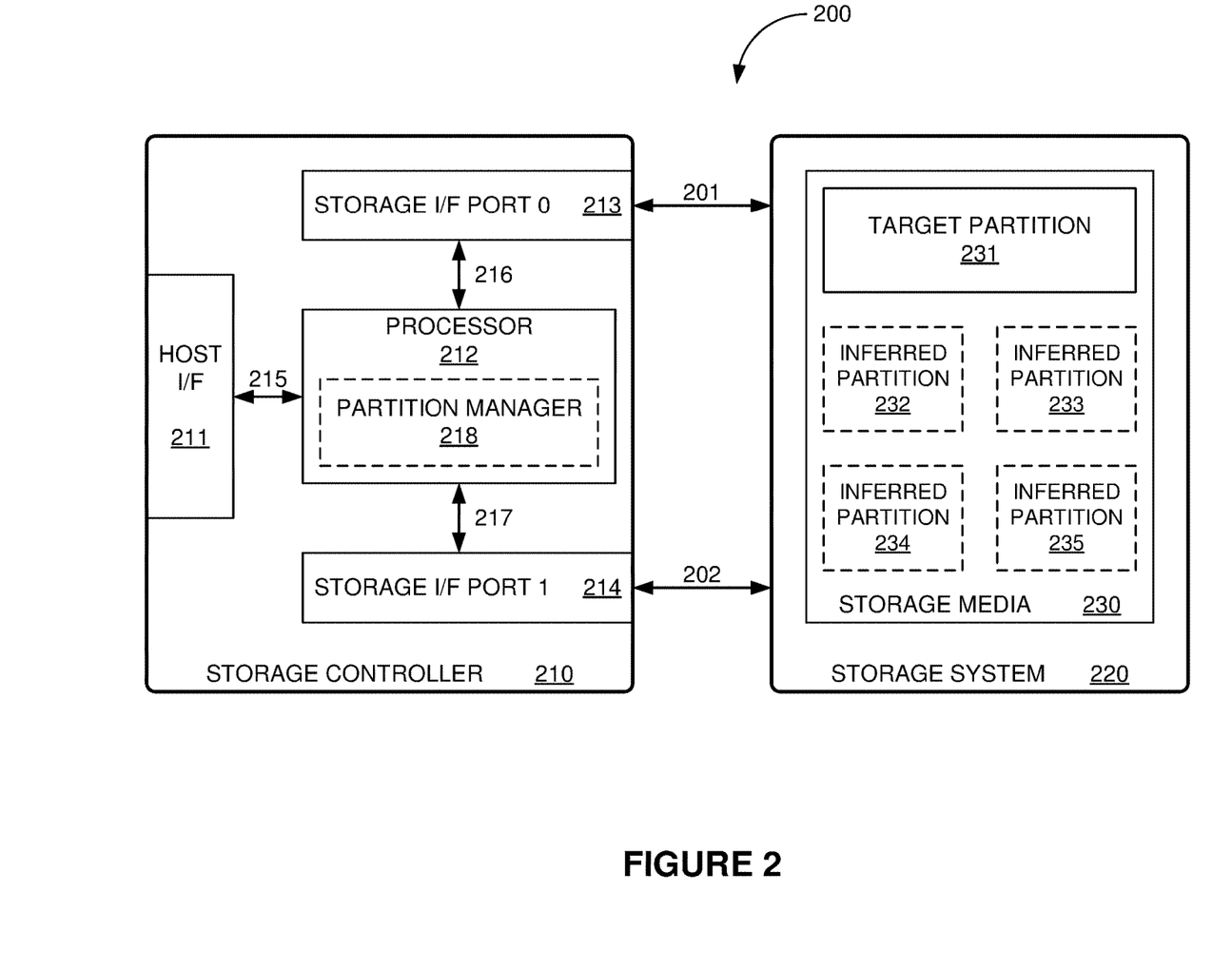
FIG. 2 illustrates an example embodiment of a data storage system.

FIG. 2 illustrates data storage system 200. This example system comprises storage controller 210 and storage system 220. Storage system 220, comprises storage array 230. Storage array 230 comprises target partition 231, and inferred partitions 232-235.

Figure 3:
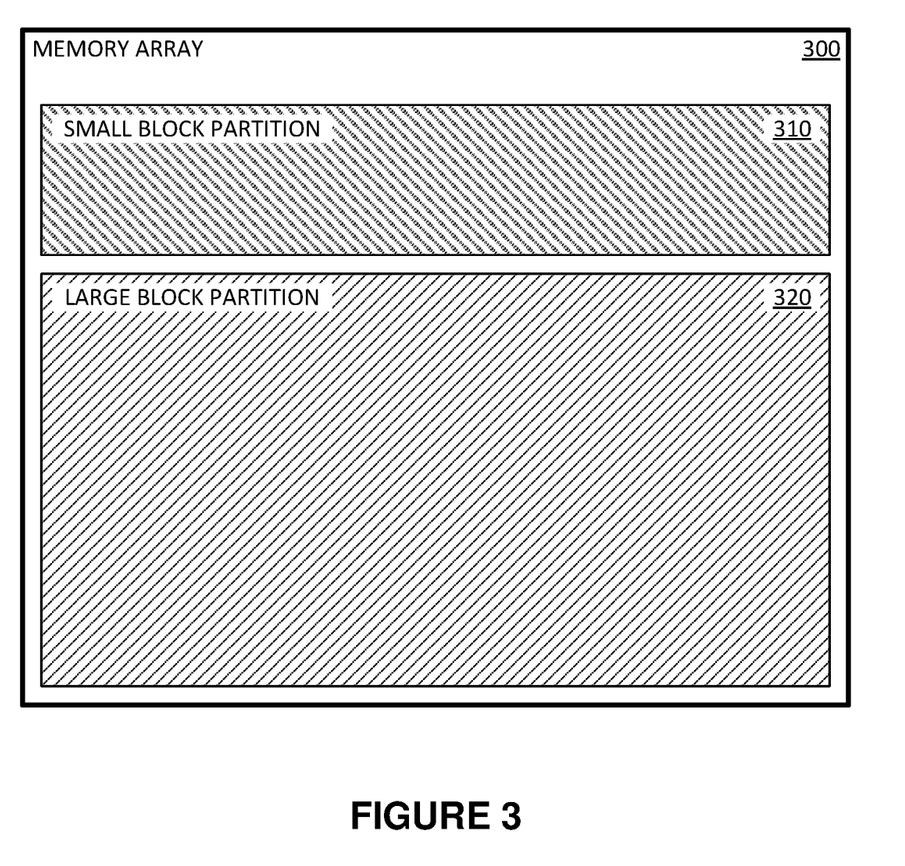
FIG. 3 illustrates an example memory array configured for use in a video streaming application.

In an example embodiment, storage media 230 comprises NAND memory integrated circuits. Other embodiments may use other types of memory. The storage media can be any non-volatile memory, such as a flash memory, magnetic random-access memory, phase change memory, optical or magnetic memory, solid-state memory, or other forms of non-volatile memory devices. In this example, storage array 230 is partitioned into a target partition 231 and several inferred partitions 232. These regions are partitioned physically on storage array 230 so that the two regions do not share any memory blocks, ensuring that each physical location on storage array 230 only belongs to one region, as illustrated in FIG. 3.

Storage controller 210 comprises a number of blocks or modules including host interface 211, processor 212 (including partition manager 218), storage interface port 0 213, and storage interface port 1 214. Processor 212 communicates with the other blocks over links 215, 216, and 217. Storage interface port 0 213 communicates with storage system 220 over link 201 and storage interface port 1 214 communicates with storage system 220 over link 202.

In some example embodiments, storage interface ports 0 and 1 (213 and 214) may use the Open NAND Flash Interface (ONFI) command protocol, or the "Toggle" command protocol to communicate with storage system 220 over links 201 and 201. The ONFI specification includes both the physical interface and the command protocol of ONFI ports 0 and 1. The interface includes an 8-bit bus (in links 201 and 202) and enables storage controller 210 to perform read, program, erase, and other associated operations within storage array 230.

In this example, processor 212 receives host data from a host through host interface 211 over link 215. Processor 212 configures the data as needed for storage in storage system 220 and transfers the data to storage interface ports 0 and 1 (213 and 214) for transfer to storage system 220 over links 201 and 202.

Typically, a single target partition 231 is employed on the storage media to store the write data stream regardless of the type of data contained within the stream. This target partition 231 is indicated by the host in any associated write commands issued by the host over the link.

Figure 4:
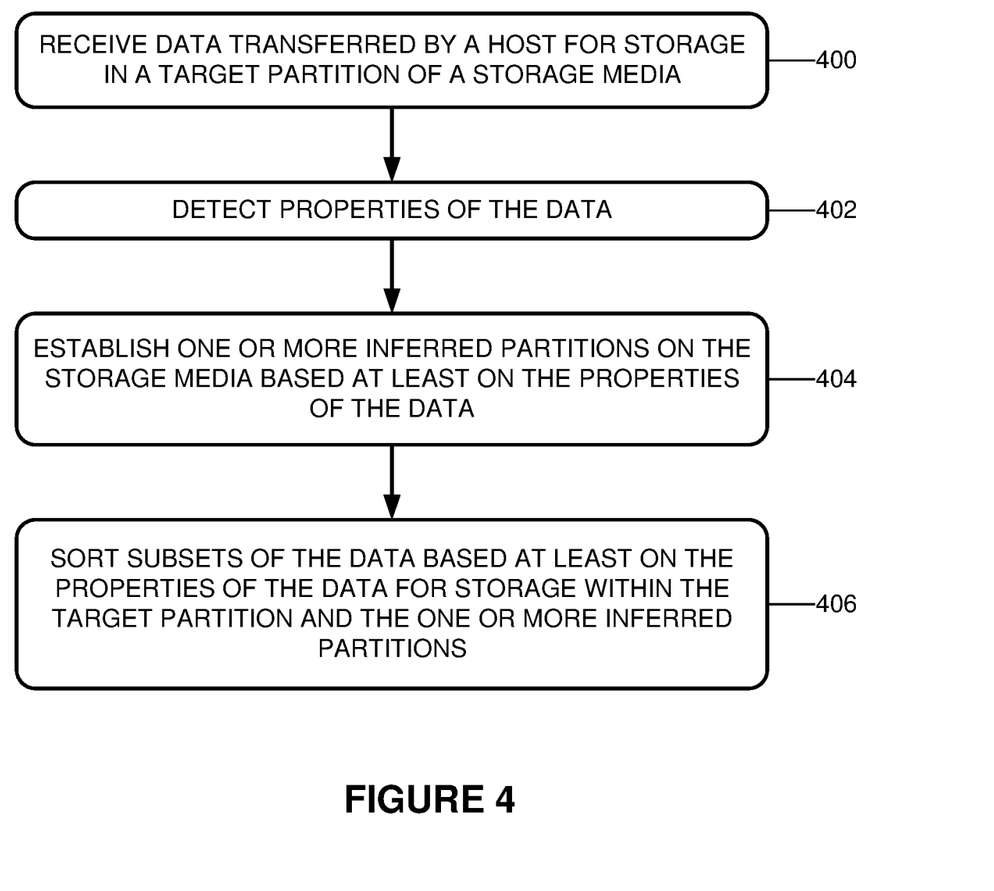
FIG. 4 illustrates an example method for partitioning data.

In this example embodiment, partition manager 218 is implemented as part of processor 212 and is configured to separate the write data stream into two or more subsets of write data, and store these subsets of write data in different partitions within storage system 220, based at least in part on properties of the write data as illustrated in FIGS. 3 and 4 and described in detail below. As discussed above, various different properties of the write data may be used to separate the write data stream into subsets. In some embodiments, host system 110 includes properties of the write data within the write data stream. In the examples discussed herein, storage controller 210 detects various properties of the write data and uses various methods to separate the write data stream into subsets.

In the enhanced examples herein, one or more inferred partitions 232-235 are created by storage controller 210. These inferred partitions 232-235 correspond to one or more properties detected for the data or write commands that correspond to the data, such as hot/cold status, write command sizing, write command location, or other factors detected from the data or the write commands.

The host will not typically indicate these inferred partitions 232-235 in any write or read commands, and storage controller 210 maintains data structures to relate host commands for data to particular inferred 232-235 or explicit 231 partitions. Responsive to further host commands, such as data writes or data reads, storage controller 210 apportions subsets of write data into the inferred partitions 232-235 or target partition 231 according to the properties previously detected for the data. Moreover, responsive to read commands, storage controller 210 provides data from the inferred partitions 232-235 or target partition 231 according to where the data was previously stored.

FIG. 3 illustrates an example memory array 300 configured for use in a video streaming application. In this example embodiment, consider a drive aimed at a video streaming application. In this example, a typical data usage pattern would be:
- Initial drive filesystem format, consisting of a small number of small block commands scattered across the LBA address space.
- Initial population of video assets, consisting of a large number of large block commands in sequential LBA locations to write multi-gigabyte video files. During the asset population operation, the filesystem blocks are read and updated multiple times.
- Video streaming, consisting of a large number of large commands in sequential LBA locations to read the multi-gigabyte video files to serve multiple customers. During this phase, the filesystem blocks are read to locate the video files. No write commands are sent to the drive.
- Asset update, consisting of deleting the existing video files and writing new video files. After the files are deleted, the command traffic is similar to the initial population phase. During asset update, video streaming is not performed to the drive.

In this example application, the drive is configured to segregate data separate partitions based on command size. Small data blocks are stored in small block partition 310, and large data blocks are stored in large block partition 320. Each partition has different properties as described below.

Small Block Partition 310:
Internal block size is set to the typical filesystem update command burst size to efficiently utilize the media and not incur extra pad data during updates.
Total partition size is some multiple of the total filesystem block count, but much smaller than the large block partition.
Minimal garbage collection operations are performed, as the data pattern is naturally self-refreshing.
Write cache is sized to a filesystem update command burst, as any extra cache capacity would be underutilized.
No read cache is created, as the read access pattern is random and unpredictable with multiple clients reading different video files based on human preference.
High throughput and small latency media (i.e. SLC) is used to keep filesystem operation time small, increasing file location performance, and decreasing exposure to power loss events.
Power loss protection is enabled, keeping the filesystem data coherent after power loss.
Flat map FTL is implemented, supporting random data access pattern, but the total map size is very small due to small partition size.

Large Block Partition 320:
Internal block size is set to the population write command size to efficiently utilize the media.
The total partition size has enough reserve capacity to support file deletion and overwrite, along with garbage collection due to media wear.
The write cache size is set to support desired asset population performance.
Minimal garbage collection operations are implemented, as the data does not change much, and only does during asset update operations.
The read cache size is set to support multiple clients performing sequential reads. A read-ahead policy is used due to a sequential read data pattern.
Lower throughput and potentially higher latency media (i.e. TLC/QLC) is utilized, and is sized to meet a desired asset population performance and a client read performance.
No power loss protection is provided. Each video asset is duplicated multiple times across the planet and is not precious per drive. The cost of checking video file integrity on power up and replacing damaged files is small compared to the cost savings of providing minimal power loss circuitry.
Extent based FTL is implemented, supporting a sequential data access pattern. The overall map size is small due to the extreme sequentiality of the data, despite the large partition size.

In this example embodiment, this drive is cheaper than a typical drive, as it needs much less power protection circuitry and DRAM than a drive aimed at general purpose use. The drive performance is higher than a typical drive, since the filesystem and video data are not combined in the same media locations.

FIG. 4 illustrates an example method for power loss recovery. In this example, storage controller 120 receives data transferred by host system 110 for storage in a target partition 131 of a storage media 130, (operation 400). Storage controller 120 detects various properties of the data, (operation 402).

Storage controller 120 establishes one or more inferred partitions 132 on the storage media 130 based at least on the properties of the data, (operation 404). Storage controller 120 sorts subsets of the data, based at least on the properties of the data, for storage within target partition 131 and the one or more inferred partitions 132.

Figure 5:
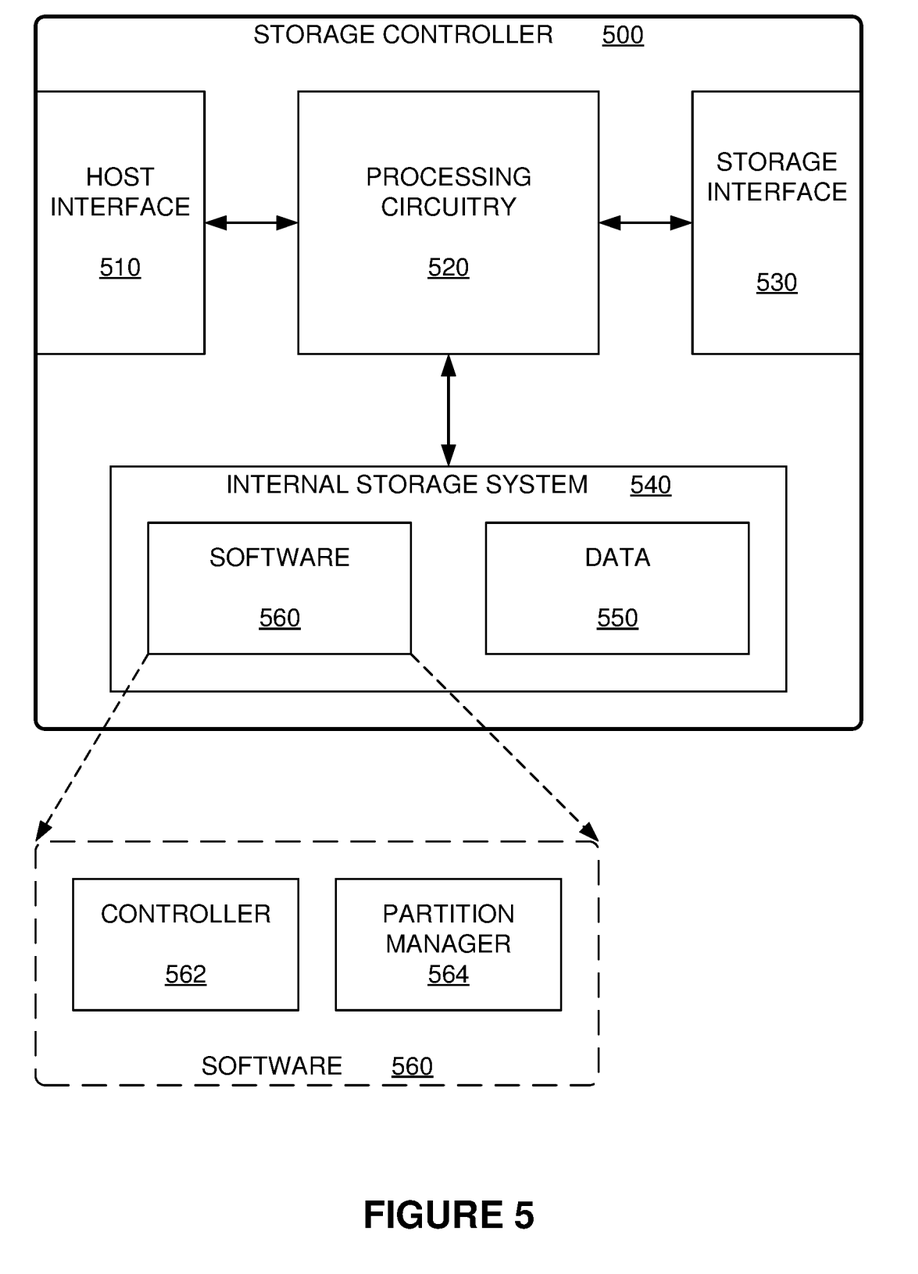
FIG. 5 illustrates a storage controller.

FIG. 5 illustrates storage controller 500, such as storage controller 210 from FIG. 2. As discussed above, storage controller 500 may take on any of a wide variety of configurations. Here, an example configuration is provided for a storage controller implemented as an ASIC. However, in other examples, storage controller 500 may be built into a storage system or storage array, or into a host system.

In this example embodiment, storage controller 500 comprises host interface 510, processing circuitry 520, storage interface 530, and internal storage system 540. Host interface 510 comprises circuitry configured to receive data and commands from an external host system and to send data to the host system.

Storage interface 530 comprises circuitry configured to send data and commands to an external storage system and to receive data from the storage system. In some embodiments storage interface 530 may include ONFI ports for communicating with the storage system.

Processing circuitry 520 comprises electronic circuitry configured to perform the tasks of a storage controller enabled to partition a write data stream into target partitions and inferred partitions as described above. Processing circuitry 520 may comprise microprocessors and other circuitry that retrieves and executes software 560. Processing circuitry 520 may be embedded in a storage system in some embodiments. Examples of processing circuitry 520 include general purpose central processing units, application specific processors, and logic devices, as well as any other type of processing device, combinations, or variations thereof. Processing circuitry 520 can be implemented within a single processing device but can also be distributed across multiple processing devices or sub-systems that cooperate in executing program instructions.

Internal storage system 540 can comprise any non-transitory computer readable storage media capable of storing software 560 that is executable by processing circuitry 520. Internal storage system 520 can also include various data structures 550 which comprise one or more databases, tables, lists, or other data structures. Storage system 540 can include volatile and nonvolatile, removable and non-removable media implemented in any method or technology for storage of information, such as computer readable instructions, data structures, program modules, or other data.

Storage system 540 can be implemented as a single storage device but can also be implemented across multiple storage devices or sub-systems co-located or distributed relative to each other. Storage system 540 can comprise additional elements, such as a controller, capable of communicating with processing circuitry 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 560 can be implemented in program instructions and among other functions can, when executed by storage controller 500 in general or processing circuitry 520 in particular, direct storage controller 500, or processing circuitry 520, to operate as described herein for a storage controller. Software 560 can include additional processes, programs, or components, such as operating system software, database software, or application software. Software 560 can also comprise firmware or some other form of machine-readable processing instructions executable by elements of processing circuitry 520.

In at least one implementation, the program instructions can include controller module 562, and partition manager module 564. Controller module 562 includes instructions directing processing circuitry 520 to operate a storage device, such as flash memory, including translating commands, encoding data, decoding data, configuring data, and the like. Partition manager module 564 includes instructions directing processing circuitry 520 to detect properties of data in a write data stream, establish inferred partitions on storage media based on the properties, and sort subsets of the write data stream for storage within a target partition or the inferred partitions, based on the properties.

In general, software 560 can, when loaded into processing circuitry 520 and executed, transform processing circuitry 520 overall from a general-purpose computing system into a special-purpose computing system customized to operate as described herein for a storage controller, among other operations. Encoding software 560 on internal storage system 540 can transform the physical structure of internal storage system 540. The specific transformation of the physical structure can depend on various factors in different implementations of this description. Examples of such factors can include, but are not limited to the technology used to implement the storage media of internal storage system 540 and whether the computer-storage media are characterized as primary or secondary storage.

For example, if the computer-storage media are implemented as semiconductor-based memory, software 560 can transform the physical state of the semiconductor memory when the program is encoded therein. For example, software 560 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a storage controller, the method comprising:
    receiving data transferred by a host for storage in a target partition of a storage media;
    detecting properties of the data;
    establishing one or more inferred partitions on the storage media based at least on the properties of the data; and
    based at least on the properties of the data, sorting subsets of the data for storage within the target partition and the one or more inferred partitions.

2. The method of claim 1, wherein the properties of the data include a frequency of updates to the data on the storage media, and recently updated data is stored in a first inferred partition, and infrequently updated data is stored in a second inferred partition.

3. The method of claim 2, wherein the first inferred partition is higher performance than the second inferred partition.

4. The method of claim 3, wherein the second inferred partition is garbage collected more frequently than the first inferred partition.

5. The method of claim 1, wherein the properties of the data include a write command size, and data having small write commands is stored in a small block partition, and data having large write commands is stored in a large block partition.

6. The method of claim 5, wherein the small block partition contains data blocks having a smaller size than data blocks within the large block partition.

7. The method of claim 1, wherein the properties of the data include a write command location, and filesystem data and metadata is written in fixed locations, and user data is written to non-fixed locations.

8. The method of claim 1, wherein the one or more inferred partitions include at least two partitions comprising different physical media.

9. The method of claim 1, wherein the one or more inferred partitions include at least two partitions having different qualities of service.

10. The method of claim 1, wherein the one or more inferred partitions include at least two partitions having different levels of power loss recovery.

11. A storage controller for a storage system, comprising:
a host interface, configured to receive data for storage within the storage system, and to transmit data from the storage system to a host system;
a storage interface, configured to transmit data to the storage system, and to receive data from the storage system; and
processing circuitry coupled with the host interface and the storage interface, configured to:
receive data transferred by a host for storage in a target partition of a storage media within the storage system;
detect properties of the data;
establish one or more inferred partitions on the storage media based at least on the properties of the data; and
based at least on the properties of the data, sort subsets of the data for storage within the target partition and the one or more inferred partitions.

12. The storage controller of claim 11, wherein the properties of the data include a frequency of updates to the data on the storage media, and recently updated data is stored in a first inferred partition, and infrequently updated data is stored in a second inferred partition.

13. The storage controller of claim 12, wherein the first inferred partition is higher performance than the second inferred partition.

14. The storage controller of claim 13, wherein the second inferred partition is garbage collected more frequently than the first inferred partition.

15. The storage controller of claim 11, wherein the properties of the data include a write command size, and data having small write commands is stored in a small block partition, and data having large write commands is stored in a large block partition.

16. The storage controller of claim 15, wherein the small block partition contains data blocks having a smaller size than data blocks within the large block partition.

17. The storage controller of claim 11, wherein the properties of the data include a write command location, and filesystem data and metadata is written in fixed locations, and user data is written to non-fixed locations.

18. The storage controller of claim 11, wherein the one or more inferred partitions include at least two partitions comprising different physical media.

19. The storage controller of claim 11, wherein the one or more inferred partitions include at least two partitions having different qualities of service.

20. The storage controller of claim 11, wherein the one or more inferred partitions include at least two partitions having different levels of power loss recovery.

* * * * *